Sept. 11, 1962 P. J. QUINN 3,053,506

JACK

Filed Oct. 19, 1960

INVENTOR.

BY PATRICK J. QUINN

*Gustav Drews* his ATTORNEY

United States Patent Office 3,053,506
Patented Sept. 11, 1962

3,053,506
JACK
Patrick J. Quinn, 4360 158th St., Flushing, N.Y.
Filed Oct. 19, 1960, Ser. No. 63,652
2 Claims. (Cl. 254—119)

This invention relates to jacks in general and more especially to portable jacks for raising an automobile body to clear a wheel and permit the change of a tire.

Among the objects of the present invention it is aimed to provide an improved jack which will be connected as an instance to the rear axle of the wheel to be raised, the ground or supporting surface, and the rear bumper, or to the front axle of the wheel to be raised, the ground or supporting surface and the front bumper, whereupon the action on the jack is to raise the axle from the ground or supporting surface relative to the bumper and subsequently in turn to raise the bumper and body of the car relative to the axle.

It is still another object of the present invention to use a lever of the first class from the standpoint of physics, using the ground or supporting surface as the fulcrum, the axle as the weight or work to be raised, and the bumper to which the actuating part of the jack is connected as the power or pressure to be applied initially and when the axle has been lifted a distance sufficient to enable the wheel to clear the ground, then to continue actuating the actuating part of the jack still connected to the bumper when the ground or supporting surface will again be the fulcrum but now the bumper constitutes the weight or work to be raised and the axle the power or pressure to be applied.

These and other features, capabilities, and advantages of the invention will appear from the subjoined detailed description of specific embodiments thereof illustrated in the accompanying drawings in which.

Figure 1:
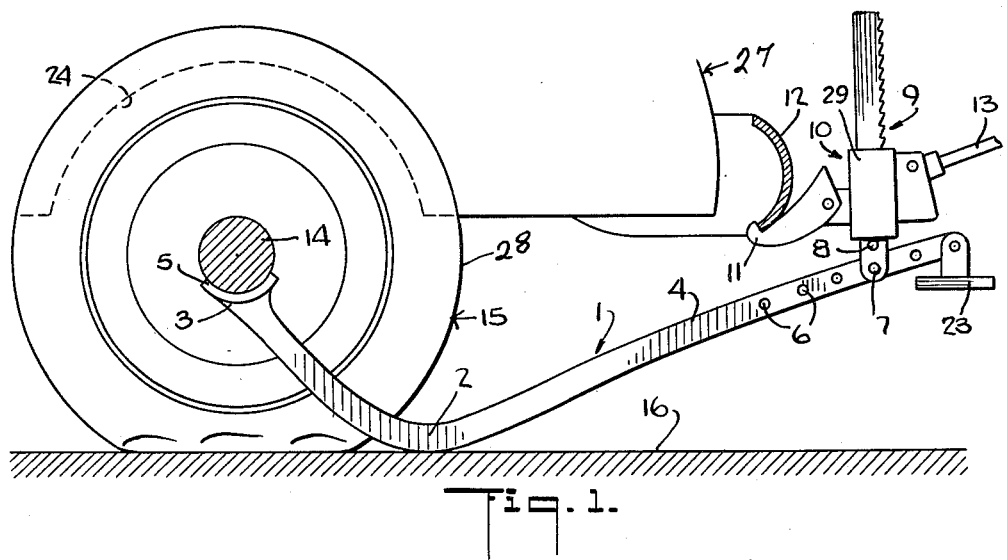
FIG. 1 is a side elevation partly in section of the jack attached to an automobile before raising the axle on which the deflected wheel is mounted.
Figure 2:
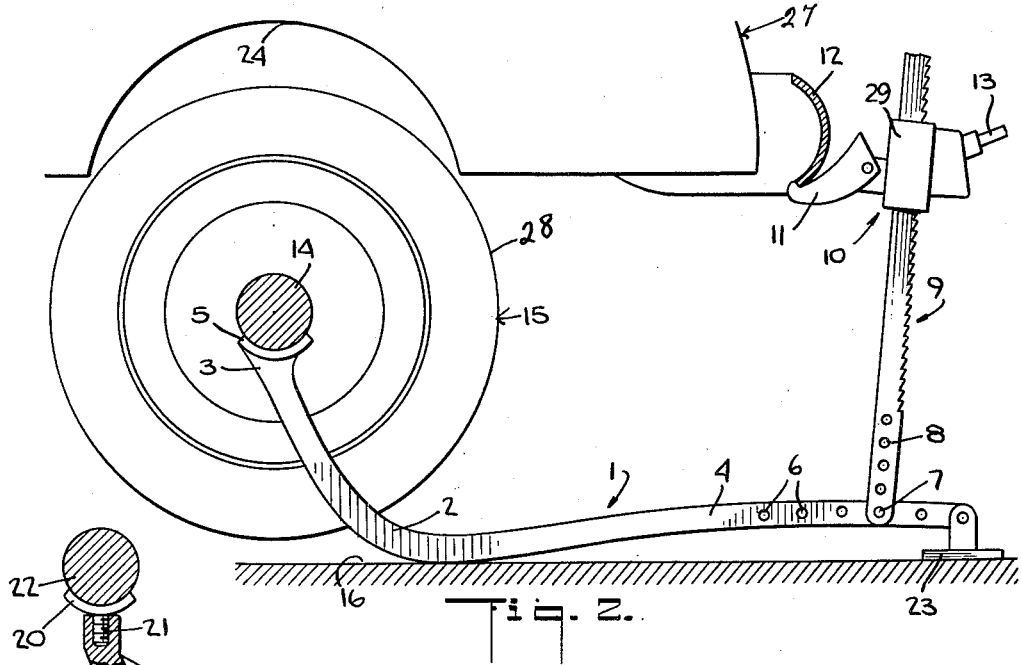
FIG. 2 is a similar side elevation after the axle has been raised.

In the embodiment shown in FIGS. 1 and 2 there is shown a bent lever 1 having a deflection or elbow 2, arc shaped in the present instance, which extends from the free end 3 to the elongated shank 4. The free end 3 has a seat conformation 5 to receive a front or rear axle of an automobile. The shank 4 has a plurality of pin openings 6 therein to receive a pin 7 which in turn extends through one of the pin openings 8 in the vertical extension or jack rack 9 of the elevating unit or jack 10 which has a shoe or pawl 11 pivotally connected to a sleeve 29 vertically slidably mounted on said extension 9, shown as engaging the rear bumper 12 of a car. The sleeve 29 is in turn connected to a lever 13 of a conventional jack. When the lever 13 according to convention is actuated, it will in turn raise the shoe 11 relative to the pin 7 connected to the shank 4 and initially through the arc 2 as a fulcrum directly engaging the supporting surface 16, transmit a lifting action on the shoe 5 in engagement with the axle 14 to raise the axle. When the axle 14 has been raised sufficiently in turn to raise the wheel 15 so that it will clear the ground or supporting surface 16, then the tendency will be with a lever of this type to exert a lifting action by the shank 4 and extension 9 on the shoe 11 in turn to lift the bumper 12 and therewith the adjacent body 27 of the car until the mudguard adjacent the wheel 15 clears the wheel to facilitate removal of a deflated tire and in turn the substitution of an inflated tire.

Figure 3:
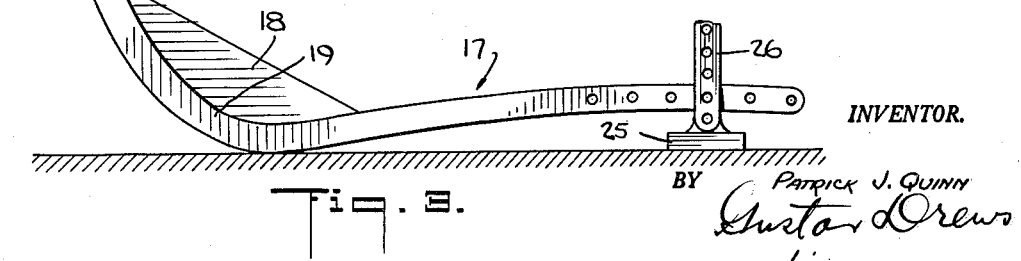
FIG. 3 is a fragmental side elevation partly in section of a modification.

In the embodiment illustrated in FIG. 3 the lever 17 in place of the lever 1 of the embodiment illustrated in FIGS. 1 and 2 has a fin or web 18 formed across the concave face of the arcuate portion 19 to reinforce the same. In turn the shoe 20 in place of the shoe 5 of the embodiment shown in FIGS. 1 and 2, is secured to a screw threaded stud 21 which is screw threadedly connected to the free end of the arcuate portion 19 to facilitate adjusting the position of the shoe 20 relative to the axle 22.

With the embodiment illustrated in FIGS. 1 and 2, after the wheel 15 has been raised clear of the supporting surface or road bed 16, the shoe 23 connected to the other free end of the shank 4 may engage this supporting surface or road bed 16, and constitute a stop to limit the downward movement of the shank 4 of the lever 1 and consequently the continued upward movement of the shoe 11 with the actuation of the lever 13 will cause the bumper 12 to rise relative to the axle 14 and therewith the mudguard 24 to rise to clear the wheel 15 with the deflated tire 28 and permit the deflated tire to be removed from the wheel 15 and in turn permit the replacement of an inflated tire to said wheel 15.

Obviously instead of positioning the shoe 23 forming the stop at the end of the shank 4 of the lever 1, a shoe 25 constituting a stop could be placed at the lower end of the extension 26, see FIG. 3.

The operation of the embodiment illustrated in FIGS. 1 and 2 aforesaid is substantially as follows:

The wheel 15 is pressing on the ground 16 with a given force F consisting of its own weight, and as much of the weight of the body 27 of the car as is transmitted to the wheel 15 through the spring (not shown). Working the jack produces a strain or force between the body 27 of the car and the outer end 3 of the lever on the axle 14 with the ground 16 as the fulcrum.

When jacking proceeds this strain between the bumper 12 and lever 1 increases, to wit, the strain tending to raise the axle 14 increases, and the strain tending to hold down the axle 14 decreases as the body 27 rises and the car spring (not shown) decompresses. At a certain point in the jacking when these two latter strains equal force F, the wheel 15 will be in equilibrium. Any jacking beyond this point will cause the wheel 15 to rise. From here on the car spring (not shown) has a balancing effect between these two strains but the ratio of elevation of the body 27 to elevation of the axle 14 will be constant. Therefore, when the wheel 15 has been raised as high as desired and jacking ceases, the wheel 15 will remain in equilibrium with no danger of descending.

Since the elevation of the car body 27 has preceded the elevation of the wheel 15, no trouble should arise from the mudguard 24 not being high enough to clear the tire 28.

For the car to come down, the weight of the car would have to elevate the outer end 3 of the lever 1 but the detent pawl (not shown) or shoe 11 on the jack will prevent this. If the downward movement of the outer end 3 of the lever 1 is prevented by a block 23 between it and the ground 16, any further jacking will not raise the wheel 15 but will raise the body 27. The force which has been stored up between the jack 10 and the bottom of the axle 14 will continue to be stored up and will maintain the wheel 15 at a constant height. Raising the body 27 is not dependent upon the downward movement of the wheel 15 but upon continued jacking after the downward movement of the outer end 3 of the lever 1 has been stopped.

In the present invention jacking causes either the body 27 to go up or the wheel 15 to go up relative to one another depending on which offers the greater resistance to the jack 10. Since it is necessary to keep jacking up the body 27 to maintain its potential for raising the wheel 15, the mudguard 24 will always be relatively higher than when the jack 10 is not in use. The spring (not shown) will be decompressed and consequently the mudguard 24 will be higher.

So long as the lever 1 is free to move up and down, the upward and the downward pressure on the jack 10 will equalize, but neither the bumper 12 nor the wheel 15 can raise or lower any more than is necessary to maintain the state of balance between the wheel 15 and the body 27 through the jack 10.

Suppose, however, that the downward movement of the outer end 3 of the lever is stopped as an instance by a block 23 between it and the ground 16, then there can be no further upward movement of the wheel 15.

Further jacking will not increase upward pressure on the wheel 15 because the lever cannot move but the body 27 is free to go up and then the pressure underneath the wheel 15 will remain constant but the pressure on the bumper 12 will increase. A pressure will be exerted upon the ground 16 through the block 23.

From then on the downward pressure on the jack 10 will equal the pressure on the lever 1 and the pressure on the ground 16 through the block 23.

Once the wheel 15 is jacked up it will stay that way until the action of the jack is reversed. It has to be jacked down.

To facilitate claiming the invention, since the lever 1 constitutes a part of the jack 10, the vertical extension 9, shoe 11, and lever 13 will be designated the actuating unit and the lever 1, seat or shoe 5, as well as the extension 9, shoe 11 and lever 13, will be designated as the jack.

It is obvious that various changes and modifications may be made to the details of construction without departing from the general spirit of the invention as set forth in the appended claims.

I claim:
1. An automobile jack comprising a bent lever having an intermediate elbow for directly engaging the supporting surface as a fulcrum, an automobile axle engaging formation at one free end of said lever for engaging the lower face of an automobile axle having a wheel thereon, an elevating unit having a sleeve pivotally connected to the rear lower face of the body portion of the automobile, a jack rack operatively connected to said sleeve and extending downwardly from said sleeve, means for pivotally and adjustably connecting the other free end of said lever to the lower end of said jack rack to form a first class lever and whereby said other free end of the lever may be vertically adjusted relative to said jack rack and said jack rack may be adjusted longitudinally relative to said other free end of the lever, and a shoe pivotally connected to said other free end of said lever to engage the supporting surface to limit the downward movement of said elevating unit after said wheel has been raised to clear the supporting surface.

2. An automobile jack such as set forth in claim 1 in which said means is characterized by said other free end of said lever having a number of openings therein, said jack rack having a plurality of openings therein and the connection between said other free end of said lever and said jack rack consists of pins extending through alined openings in said other free end of said lever, and said jack rack.

References Cited in the file of this patent
UNITED STATES PATENTS

| | | |
|---|---|---|
| 2,001,467 | Madigan | May 14, 1935 |
| 2,521,266 | Swisher | Sept. 5, 1950 |
| 2,743,903 | Lucker | May 1, 1956 |

FOREIGN PATENTS

| | | |
|---|---|---|
| 29,735 | Austria | Sept. 10, 1907 |